(12) United States Patent
Hsieh

(10) Patent No.: US 9,227,463 B2
(45) Date of Patent: Jan. 5, 2016

(54) ADJUSTABLE WHEEL COVER FOR ALUMINUM ALLOY RIM

(71) Applicant: SOUN MIN CO., LTD., Tainan (TW)

(72) Inventor: Yung-Ting Hsieh, Tainan (TW)

(73) Assignee: Soun Min Co., Ltd., Tainan (TW)

( * ) Notice: Subject to any disclaimer, the term of this patent is extended or adjusted under 35 U.S.C. 154(b) by 193 days.

(21) Appl. No.: 14/019,719

(22) Filed: Sep. 6, 2013

(65) Prior Publication Data
US 2015/0069823 A1      Mar. 12, 2015

(51) Int. Cl.
*B60B 7/00*      (2006.01)
*B60B 7/10*      (2006.01)
*B60B 7/06*      (2006.01)

(52) U.S. Cl.
CPC . *B60B 7/10* (2013.01); *B60B 7/008* (2013.01); *B60B 7/065* (2013.01); *B60B 2900/325* (2013.01); *B60B 2900/3312* (2013.01)

(58) Field of Classification Search
CPC .............. B60B 7/00; B60B 7/10; B60B 7/12; B60B 7/061; B60B 7/065
USPC ................... 301/37.31, 37.101, 37.34, 37.102
See application file for complete search history.

(56) References Cited

U.S. PATENT DOCUMENTS 6,443,528 B1 *  9/2002  Polka ........................ 301/37.102
2007/0096545 A1 *  5/2007  Wang ......................... 301/37.42

FOREIGN PATENT DOCUMENTS

TW      M275112 M      5/1994

* cited by examiner

*Primary Examiner* — John Walters
*Assistant Examiner* — James Triggs
(74) *Attorney, Agent, or Firm* — Rosenberg, Klein & Lee

(57) ABSTRACT

An adjustable wheel cover for aluminum alloy rims is revealed. A wheel cover is disposed with through holes corresponding to hollow holes of an aluminum alloy rim. A peripheral wall is extended axially from an inner surface of the wheel cover and along a periphery of each through hole. At least one assembly part is formed on the peripheral wall and an insertion slot for receiving a fixing part is arranged at the assembly part axially. The assembly part is disposed with a plurality of adjustment holes radially. A locking block on a spring of the fixing part is secured in the adjustment hole correspondingly. Thus the wheel cover can be adjusted flexibly to fit the aluminum alloy rims with production tolerances. The problem of unstable connection between the wheel cover and the aluminum alloy rim caused by unmatched size can also be solved.

3 Claims, 4 Drawing Sheets

ADJUSTABLE WHEEL COVER FOR ALUMINUM ALLOY RIM

BACKGROUND OF THE INVENTION

1. Fields of the Invention

The present invention relates to an adjustable wheel cover for aluminum alloy rims, especially to an adjustable wheel cover for aluminum alloy rims that includes a moveable mounting flange for adjusting the position a wheel cover and an aluminum alloy rim being secured with each other so as to solve the problem of unstable connection between the wheel cover and the aluminum alloy rim caused by the unmatched size. Moreover, the wheel cover can be adjusted flexibly to fit respective aluminum alloy rim with different production tolerance.

2. Descriptions of Related Art

Cars are the most common transportation vehicles in daily lives. The transportation time is reduced by driving cars. Cars also provide shielding during days with bad weather. For running smoothly on the road, the car is disposed with a plurality of wheels. The rim that holds the wheel is the most important component for wheels. Among various rims, aluminum alloy rims are the most popular due to light weight and high strength. Compared with conventional grayish-black iron rim, the aluminum alloy rim is more aesthetics. Thus it is not necessary to use a wheel cover for modifying the appearance of the rim. For modified vehicle owners, they can still use stylish to cover an outer surface of the aluminum alloy rim for improving aesthetics or protection.

Refer to Taiwanese Pat. Pub. No. M275112 "aluminum alloy rim cover", a cover fit an aluminum alloy rim is revealed. The cover is disposed with through holes corresponding to hollow parts of the aluminum alloy rim. A peripheral wall is extended from an edge of the through hole toward an inner side of the cover. A flange is projecting from the edge of the peripheral wall. While assembling the cover with the aluminum alloy rim, the flange is mounted and locked into the hollow part of the aluminum alloy rim. Thus the cover and the aluminum alloy rim are connected and fixed to each other conveniently and firmly. The structure with such design is quite popular.

As to some aluminum alloy rims that are more classical or popular, many manufacturers create molds for mass production. Due to production tolerance, the length of the peripheral wall extended from the through hole of the cover is often not matched with the depth of the hollow part of the aluminum alloy rim. Thus the flange on the edge of the peripheral wall of the cover is unable to be mounted and locked with an edge on an inner end of the hollow part of the aluminum alloy rim precisely. This results in difficulty in assembling the cover with the aluminum alloy rim produced by different manufacturers. There is a decline in sales of the wheel covers.

Thus there is a room for improvement and a need to provide a novel design of the cover for the aluminum alloy rim that overcomes the shortcomings mentioned above.

SUMMARY OF THE INVENTION

Therefore it is a primary object of the present invention to provide an adjustable wheel cover for aluminum alloy rims. The adjustable wheel cover includes a moveable mounting flange for adjusting the position a wheel cover and an aluminum alloy rim being locked with each other so as to solve the problem of unstable connection between the wheel cover and the aluminum alloy rim caused by the unmatched size. Moreover, the wheel cover can be adjusted flexibly to fit respective aluminum alloy rim with different production tolerance.

In order to achieve the above object, an adjustable wheel cover for aluminum alloy rims includes a wheel cover put over an outer surface of an aluminum alloy rim. The wheel cover is disposed with through holes corresponding to hollow holes of the aluminum alloy rim. A peripheral wall is extended axially from an inner surface of the wheel cover and along a periphery of each through hole for being fit into the hollow hole of the aluminum alloy rim. An assembly part is formed on outer sides of the peripheral wall of the through hole. The assembly part is disposed with an insertion slot axially and a plurality of adjustment holes radially. The insertion slot and the adjustment holes communicate with each other. Moreover, a fixing part is inserted in the insertion slot of the assembly part. The fixing part includes a spring disposed with a locking block. The locking block is for being locked in the adjustment hole of the assembly part. A mounting flange is formed on one end of the fixing part extended out of the insertion slot of the assembly part. The mounting flange is mounted and locked with an edge on an inner end of the hollow hole of the aluminum alloy rim.

The spring is connected to the fixing part by only one side thereof while the rest sides of the spring are separated from the fixing part.

The assembly part on outer sides of the peripheral wall of the through hole is located at each of at least two corresponding sides of the peripheral wall.

While the wheel cover being fit the aluminum alloy rim, the locking block on the spring of the fixing part is separated with the adjustment hole of the assembly part and released from the locked state if the mounting flange on one end of the fixing part is unable to be locked with an edge on an inner end of the hollow hole of the aluminum alloy rim precisely. Then the mounting flange is adjusted and moved to a position that allows the mounting flange to be locked with the edge on the inner end of the hollow hole of the aluminum alloy rim precisely. Thus the locking block of the spring and the adjustment hole are locked with each other. Thereby the wheel cover can be adjusted flexibly to fit the aluminum alloy rims with different production tolerances. The problem of unstable connection between the wheel cover and the aluminum alloy rim caused by unmatched size can also be solved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
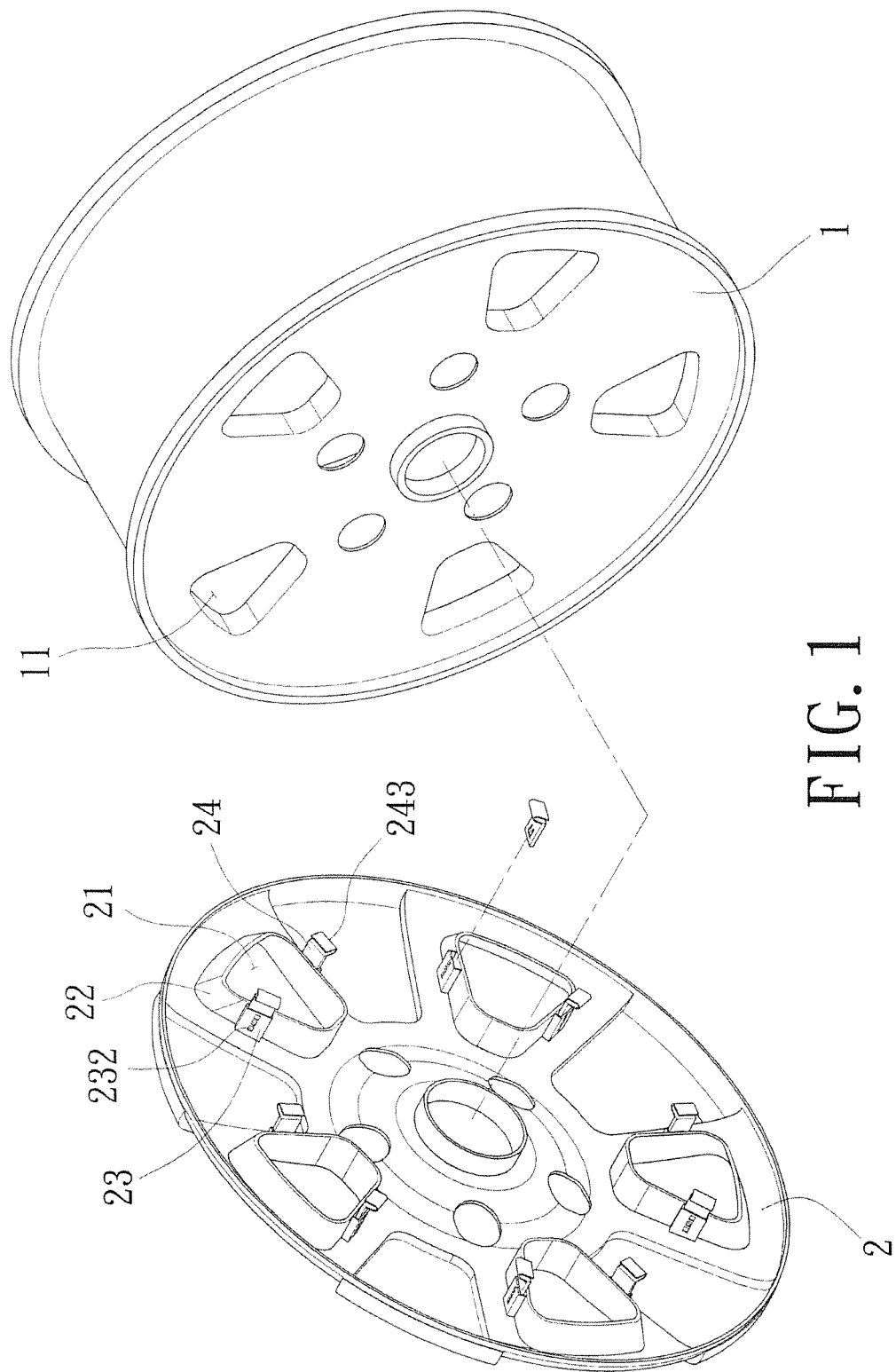
FIG. 1 is an explosive view of an embodiment according to the present invention.
Figure 2:
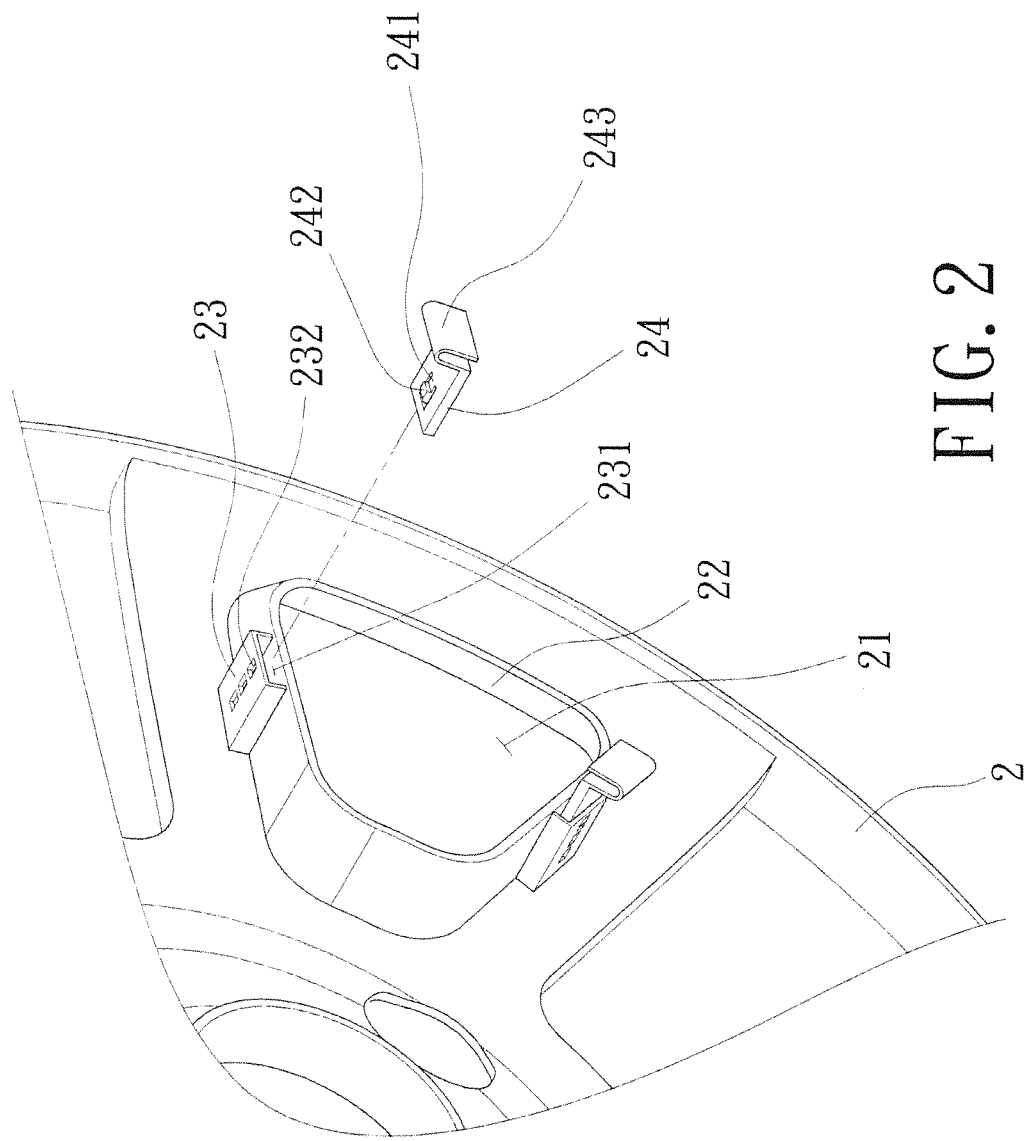
FIG. 2 is a partial enlarged explosive view of an embodiment according to the present invention.
Figure 3:
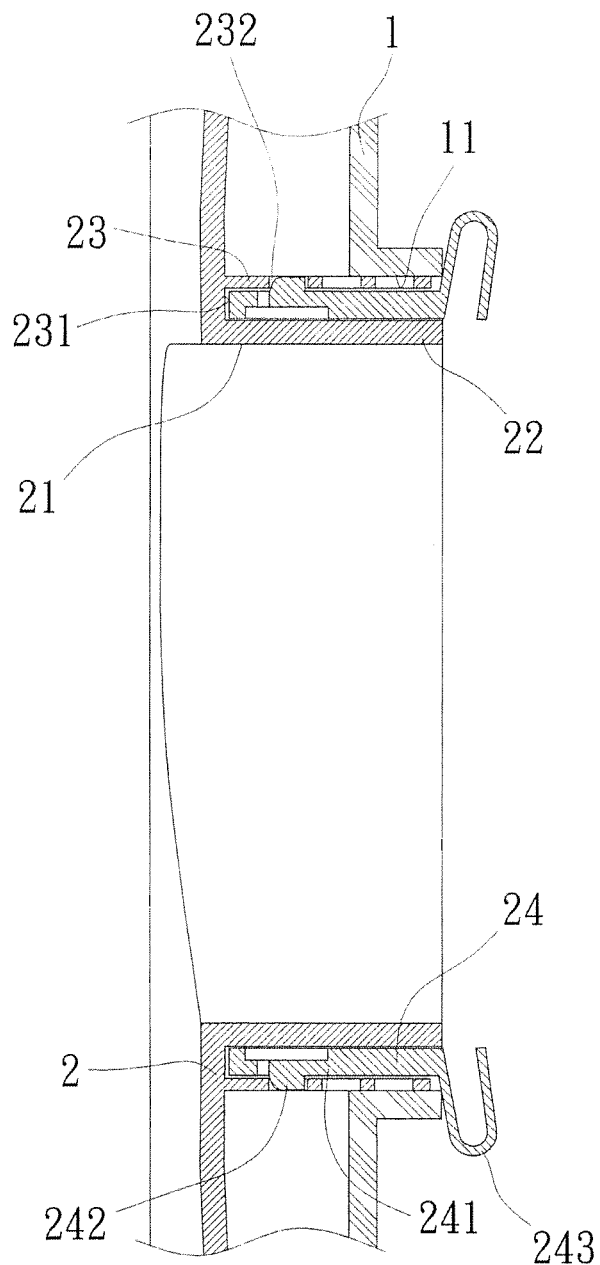
FIG. 3 is a cross sectional view of an embodiment according to the present invention.

Refer to FIG. 1, FIG. 2, and FIG. 3, a wheel cover 2 of the present invention is set over an outer surface of an aluminum alloy rim 1. The wheel cover 2 is disposed with through holes 21 respectively corresponding to hollow holes 11 of the aluminum alloy rim 1. A peripheral wall 22 is extended from an inner surface of the wheel cover and along a periphery of each through hole 21 axially. The peripheral wall 22 is fit into the hollow hole 11 of the aluminum alloy rim 1 correspondingly. An assembly part 23 is formed on each of two corresponding outer sides of the peripheral wall 22 of each through hole 21. The assembly part 23 includes an insertion slot 231 disposed axially and a plurality of adjustment holes 232 arranged radially. The insertion slot 231 and the adjustment holes 232 communicate with each other. Moreover, a fixing part 24 is mounted in the insertion slot 231 of the assembly part 23. The fixing part 24 includes a spring 241, a locking block 242 and a mounting flange 243. Only one side of the spring 241 is connected to the fixing part 24 while the rest sides are separated from the fixing part 24. The locking block 242 is set on the spring 241 and is locked in the adjustment holes 232 of the assembly part 23 correspondingly. As to the mounting flange 243, it is formed on one end of the fixing part 24 extended out of the insertion slot 231 of the assembly part 23. The mounting flange 243 is mounted and locked with an edge on an inner end of the hollow hole 11 of the aluminum alloy rim 1.

While the wheel cover 2 and the aluminum alloy rim 1 being assembled with each other, the wheel cover 2 is set on an outer side of the aluminum alloy rim 1 and the through hole 21 of the wheel cover 2 is aligned with the hollow hole 11 of the aluminum alloy rim 1, as shown in FIG. 1. Then the peripheral wall 22 extended axially along the through hole 21 of the wheel cover 2 is mounted into the hollow hole 11 of the aluminum alloy rim 1. By the mounting flange 243 of the fixing part 24 arranged at the assembly part 23 formed on the peripheral wall 22 of the wheel cover 2 being mounted and locked with an edge on an inner end of the hollow hole 11 of the aluminum alloy rim 1, the wheel cover 2 is connected to and fixed on the aluminum alloy rim 1.

Figure 4:
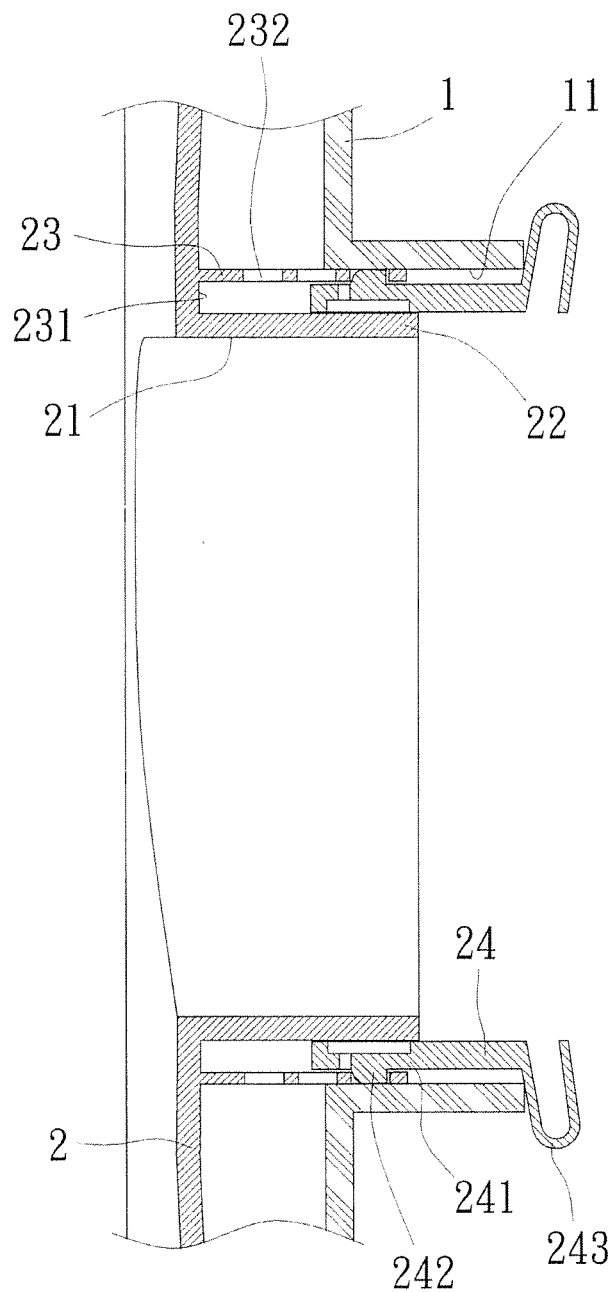
FIG. 4 is a cross sectional view of an embodiment during adjustment process according to the present invention.

If the user finds that the mounting flange 243 of the fixing part 24 of the wheel cover 2 is unable to be mounted and locked with the edge on the inner end of the hollow hole 11 of the aluminum alloy rim 1 precisely after the assembling process of the wheel cover 2 with the aluminum alloy rim 1, the user needs to check the distance between the mounting flange 243 of the fixing part 24 and the edge on the inner end of the hollow hole 11 of the aluminum alloy rim 1 as a criteria for adjustment of the length of the fixing part 24, as shown in FIG. 4. First remove the wheel cover 2 from the aluminum alloy rim 1. Then the user presses the locking block 242 of the fixing part 24 against the adjustment holes 232 of the assembly part 23 by his hand. Due to the design of the spring 241 connected to the locking block 242, the locking block 242 is released from a state of being locked in the adjustment holes 232 of the assembly part 23 and the fixing part 24 is moveable in the insertion slot 231 of the assembly part 23. Next the user moves the fixing part 24 to extend out of or retract into the assembly part 23 according to the distance between the mounting flange 243 of the fixing part 24 and the edge on the inner end of the hollow hole 11 of the aluminum alloy rim 1 estimated. Then the locking block 242 on the spring 241 of the fixing part 24 is locked into a corresponding adjustment hole 232 of the assembly part 23. Thus the mounting flange 243 of the fixing part 24 is adjusted to a locked position that matches the specification of the aluminum alloy rim 1 properly.

Then the user sets the wheel cover 2 on an outer side of the aluminum alloy rim 1 again and mount the peripheral wall 22 extended axially along the through hole 21 of the wheel cover 2 into the hollow hole 11 of the aluminum alloy rim 1. Thus the mounting flange 243 of the fixing part 24 arranged at the assembly part 23 of the peripheral wall 22 of the wheel cover 2 is mounted and locked with the edge on the inner end of the hollow hole 11 of the aluminum alloy rim 1 again. The length of the fixing part 24 has already been adjusted properly so that the mounting flange 243 formed on the fixing part 24 is mounted and locked with the edge on the inner end of the hollow hole 11 of the aluminum alloy rim 1 precisely. The wheel cover 2 and the aluminum alloy rim 1 are connected and fit each other firmly.

Due to the moveable and adjustable mounting flange 243 mounted and locked with the aluminum alloy rim 1 correspondingly, the assembly problem caused by the production tolerances of the aluminum alloy rim 1 can be solved. Thus the wheel cover 2 is able to be assembled well with the aluminum alloy rim 1 manufactured by different companies. Users can choose various wheel cover 2 they like to fit the aluminum alloy rim 1 of the vehicles so as to make unique vehicles that suit their personal taste.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An adjustable wheel cover for aluminum alloy rims comprising:
   a wheel cover set over an outer surface of an aluminum alloy rim; wherein the wheel cover is disposed with through holes corresponding to hollow holes of the aluminum alloy rim extending in an axial direction between opposing outer and inner sides thereof;
   a peripheral wall is extended in the axial direction from an inner surface of the wheel cover and formed about a periphery of each through hole to fit into one of the hollow holes of the aluminum alloy rim;
   an assembly part formed on an outer sides of the peripheral wall of each through hole, the assembly part defining an insertion slot and having a plurality of adjustment holes formed transversely therein to communicate with the insertion slot; and,
   a fixing part inserted in the insertion slot of the assembly part; a locking block defining a spring formed on the fixing part; the locking block being locked in one of the adjustment holes of the assembly part; the spring being connected to the fixing part at one end to extend deflectively therefrom and terminate at a free end; a mounting flange is formed on one end of the fixing part extending out of the insertion slot of the assembly part, wherein and the mounting flange is mounted and locked at an edge on an inner end of the hollow hole of the aluminum alloy rim against the inner side of the aluminum alloy wheel.

2. An adjustable wheel cover for aluminum alloy rims comprising:
   a wheel cover set over an outer surface of an aluminum alloy rim; wherein the wheel cover is disposed with through holes corresponding to hollow holes of the aluminum alloy rim;
   a peripheral wall extended in the axial direction from an inner surface of the wheel cover and formed about a periphery of each through hole to fit into one of the hollow holes of the aluminum alloy rim;
   an assembly part formed on an outer side of the peripheral wall of each through hole, the assembly part defining an insertion slot and having a plurality of adjustment holes formed transversely therein to communicate with the insertion slot; and, a fixing part inserted in the insertion slot of the assembly part; a locking block defining a spring formed on the fixing part; the locking block being locked in one of the adjustment holes of the assembly part; a mounting flange formed on one end of the fixing part extending out of the insertion slot of the assembly part, wherein the mounting flange is mounted and locked at an edge on an inner end of the hollow hole of the aluminum alloy rim;

wherein the spring is connected to the fixing part at one end and extends deflectively therefrom to terminate at a free end; and, wherein the assembly part is formed on outer sides of the peripheral wall of the through hole located on at least two corresponding sides of the through hole.

3. An adjustable wheel cover for aluminum alloy rims comprising:

a wheel cover set over an outer surface of an aluminum alloy rim; wherein the wheel cover is disposed with through holes corresponding to hollow holes of the aluminum alloy rim;

a peripheral wall extended in the axial direction from an inner surface of the wheel cover and formed about a periphery of each through hole to fit into one of the hollow holes of the aluminum alloy rim;

an assembly part formed on an outer side of the peripheral wall of each through hole, the assembly part defining an insertion slot and having a plurality of adjustment holes formed transversely therein to communicate with the insertion slot; and, a fixing part inserted in the insertion slot of the assembly part; a locking block defining a spring formed on the fixing part; the locking block being locked in one of the adjustment holes of the assembly part; a mounting flange formed on one end of the fixing part extending out of the insertion slot of the assembly part, wherein the mounting flange is mounted and locked at an edge on an inner end of the hollow hole of the aluminum alloy rim;

wherein the assembly part is formed on outer sides of the peripheral wall of the through hole located on at least two corresponding sides of the through hole.

\* \* \* \* \*